(12) United States Patent
Harada et al.

(10) Patent No.: US 9,540,036 B2
(45) Date of Patent: Jan. 10, 2017

(54) ELECTRONIC CONTROL UNIT FOR ELECTRIC POWER STEERING

(71) Applicant: NIDEC ELESYS CORPORATION, Kawasaki-shi, Kanagawa (JP)

(72) Inventors: Kazuki Harada, Kawasaki (JP); Tokuji Tatewaki, Kawasaki (JP); Eiji Wada, Kawasaki (JP); Osamu Maeshima, Kawasaki (JP); Masatoshi Matsuzaki, Kawasaki (JP)

(73) Assignee: Nidec Elesys Corporation, Kanagawa (JP)

( * ) Notice: Subject to any disclaimer, the term of this patent is extended or adjusted under 35 U.S.C. 154(b) by 0 days.

(21) Appl. No.: 14/576,758

(22) Filed: Dec. 19, 2014

(65) Prior Publication Data

US 2015/0175191 A1 Jun. 25, 2015

(30) Foreign Application Priority Data

Dec. 19, 2013 (JP) ................................. 2013-262584

(51) Int. Cl.
*B62D 5/04* (2006.01)
*B62D 15/02* (2006.01)

(52) U.S. Cl.
CPC ............. *B62D 5/049* (2013.01); *B62D 15/021* (2013.01); *B62D 15/0235* (2013.01)

(58) Field of Classification Search
CPC .... B62D 5/049; B62D 15/021; B62D 15/0235
See application file for complete search history.

(56) References Cited

U.S. PATENT DOCUMENTS

2013/0063136 A1* 3/2013 Hamaguchi ............ G01D 5/145
  324/207.25
2014/0336878 A1* 11/2014 Yanai ..................... G01D 5/145
  701/41

FOREIGN PATENT DOCUMENTS

JP 2012-103089 A 5/2012
JP 2012-103090 A 5/2012

* cited by examiner

*Primary Examiner* — Basil T Jos
(74) *Attorney, Agent, or Firm* — Keating & Bennett, LLP

(57) ABSTRACT

An electronic control apparatus configured to control electric power steering and provided integrally with an electric motor is electrically connected to an ignition switch and which assists a rotation operation of a steering column by rotation of the electric motor. A first magnetism detecting element configured to operate using power supplied via the ignition switch to output a first set of rotation angle signals of the electric motor. A second magnetism detecting element configured to operate continuously using continuously supplied power to output a second set of rotation angle signals of the electric motor. A controller configured or programmed to generate rotation angle information about the electric motor based on the first set of rotation angle signals and the second set of rotation angle signals outputted while the ignition switch is stopped and to calculate a position of a steering wheel from the generated rotation angle information.

23 Claims, 8 Drawing Sheets

1 : ELECTRIC POWER STEERING APPARATUS (EPS)

1 : ELECTRIC POWER STEERING APPARATUS (EPS)

ELECTRONIC CONTROL UNIT FOR ELECTRIC POWER STEERING

BACKGROUND OF THE INVENTION

1. Field of the Invention

The present invention relates to an electronic control apparatus for electric power steering preferable for use in a vehicle in which an electric motor is used to assist an operation of rotating a steering column.

2. Description of the Related Art

An electric power steering apparatus is provided with an angle sensor for detecting a steering angle of a steering wheel (a rotation angle of a steering column). For example, as described in Japanese Patent Laid-Open No. 2012-103089, the angle sensor operates by power supplied from a battery, and it has a rotation angle sensor for detecting a rotation angle of the rotation shaft of an electric motor, such as a brushless DC motor. The rotation angle sensor refers to an MR sensor or the like which is constituted by magnetoresistive elements for detecting change in the magnetic field of a rotation member constituted by a magnetic body attached to the rotation shaft of the electric motor.

The MR sensor is arranged so that the phase is displaced by $\pi/2$ according to a rotation angle of the rotation member, and the magnetoresistive elements the electrical resistance value of which changes according to strength of the magnetic field constitute a bridge circuit. By the angle sensor configured as described above, a controller can acquire an angle signal of a sine wave ($\sin \theta$) and a cosine wave ($\cos \theta$) corresponding to a rotation angle $\theta$ of the electric motor.

Further, as described in Japanese Patent Laid-Open No. 2012-103090, there are known an angle sensor capable of continuing acquiring information related to the steering angle of a steering wheel even under an environment where the ignition switch is not operating, and an electric power steering apparatus steering provided with the angle sensor.

According to the prior-art techniques described above, since it is necessary to provide an angle sensor inside an electric motor, the angle sensor and a controller therefor are separately required. A harness is also necessary to connect the angle sensor and the controller. With increase in the number of parts, measures for noise are also required, which causes increase in cost. Furthermore, when an abnormality occurs in the angle sensor, normal assist control becomes impossible. This is a problem from a viewpoint of reliability.

SUMMARY OF THE INVENTION

In one preferable preferred embodiment of the present application, an electronic control apparatus configured to control electric power steering and provided integrally with an electric motor is electrically connected to an ignition switch and which assists a rotation operation of a steering column by rotation the electric motor. A magnetic body is attached to a rotation shaft of the electric motor and provided with a pole face including a plurality of magnetic poles arranged at equal or substantially equal intervals in a circumferential direction of the rotation shaft. A first magnetism detecting element located at a position opposite to the pole face and configured to operate using power supplied via the ignition switch to output a first set of rotation angle signals of the electric motor. A second magnetism detecting element located at the position opposite to the pole face and configured to operate continuously using continuously supplied power to output a second set of rotation angle signals of the electric motor.

A controller configured or programmed to generate rotation angle information about the electric motor based of the first set of rotation angle signals and the second set of rotation angle signals outputted while the ignition switch is stopped and to calculate a position of a steering wheel from the generated rotation angle information.

In the electronic control apparatus described above, the first magnetism detecting element is an MR sensor, and the second magnetism detecting element is an MR sensor or a Hall element.

In the electronic control apparatus described above, the MR sensor include a bridge circuit including at least one pair of magnetoresistive elements angular positions of which differ by a predetermined angular interval around the center of the rotation shaft; and the predetermined angular interval is an interval corresponding to a half of the angular arrangement interval among the plurality of magnetic poles around the center of the rotation shaft.

In the electronic control apparatus described above, the controller is configured or programmed to include: a control circuit section configured to calculate position information about the steering wheel; and a monitoring circuit section configured to acquire the second set of rotation angle signals from the second magnetism detecting element, to generate a second rotation angle information from the second set of rotation angle signals, and to transmit the second rotation angle information or the second set of rotation angle signals to the control circuit section, when receiving a control instruction from the control circuit section.

In the electronic control apparatus described above, the monitoring circuit section is configured to monitor the generated second rotation angle information at predetermined time intervals set inside the monitoring circuit section.

In the electronic control apparatus described above, the monitoring circuit section is configured to monitor the generated second rotation angle information at predetermined time intervals specified by the control circuit section.

In the electronic control apparatus described above, the control circuit section is configured to store the second rotation angle information about the electric motor and the position information about the steering wheel immediately after the ignition switch is stopped; and, when the ignition switch operates a next time, the control circuit section is configured to calculate position information about the steering wheel at a present time point from the second rotation angle information acquired from the monitoring circuit section and the stored position information about the steering wheel.

In the electronic control apparatus described above, when the ignition switch operates, the control circuit section is configured to acquire the second rotation angle information from the monitoring circuit section, compare a result of an arithmetic operation of a rotation angle of the electric motor managed by the control circuit section itself, and use the acquired second rotation angle information to diagnose certainty of the rotation angle of the electric motor.

In the electronic control apparatus described above, when the ignition switch operates, the control circuit section is configured to acquire the second set of rotation angle signals from the second magnetism detecting element via the monitoring circuit section, compare the result of an arithmetic operation of a rotation angle of the electric motor managed by the control circuit section itself, and use the second rotation angle information obtained by an arithmetic operation on the basis of the acquired second set of rotation angle signals to diagnose certainty of the rotation angle of the electric motor.

In the electronic control apparatus described above, when the ignition switch operates, the control circuit section is configured to acquire the second set of rotation angle signals from the second magnetism detecting element via the monitoring circuit section, compare the result of calculation of a rotation angle of the electric motor managed by the control circuit section itself, and use the second rotation angle information obtained by performing an arithmetic operation on the basis of the acquired second set of rotation angle signals to diagnose certainty of output of the first magnetism detecting element or the second magnetism detecting element.

In the electronic control apparatus described above, the controller is configured or programmed to include a control circuit section and a monitoring circuit section. The monitoring circuit section configured to calculate a steering position of the steering wheel based on the second rotation angle information generated based on the second set of rotation angle signals outputted from the second magnetism detecting element and stores the steering position of the steering wheel, when receiving a control instruction from the control circuit section, and, when the ignition switch operates, transmits the stored position information about the steering wheel to the control circuit section.

In the electronic control apparatus described above, the monitoring circuit section is configured to calculate rotation position information about the electric motor from the second rotation angle information based on the time point of receiving the control instruction, store the rotation position information, and, when the ignition switch operates, transmit the stored rotation position information to the control circuit section.

In the electronic control apparatus described above, the monitoring circuit section is configured to transmit an operation abnormality signal to the control circuit section when the monitoring circuit section detects that it is not possible to output the second rotation angle information while the ignition switch is stopped.

In the electronic control apparatus described above, if the monitoring circuit section detects that it is not possible to output the second rotation angle information while the ignition switch is stopped, the monitoring circuit section calculates the position information about the steering wheel when the ignition switch operates a next time and the steering column is steered by the electric motor.

In the electronic control apparatus described above, the battery and a first power source circuit section and a second power source circuit section are provided. The first power source circuit section is electrically connected to the battery via the ignition switch to supply power to the first magnetism detecting element and the control circuit section. The second power source circuit section is electrically connected to the battery to supply power to the second magnetism detecting element and the monitoring circuit section.

In the electronic control apparatus described above, the battery and a common power source circuit are provided. The common power source circuit section includes a first power source output terminal and a second power source output terminal. The first power source output terminal is connected to the battery via the ignition switch to distribute power outputted from the battery to the first magnetism detecting element and the control circuit section via the ignition switch. The second power source output terminal is electrically connected to the battery to distribute power outputted from the battery to the second magnetism detecting element and the monitoring circuit section.

In the electronic control apparatus described above, a composite integrated circuit section includes at least two of the monitoring circuit section, the first power source circuit section, the second power source circuit section and the common power source circuit section, the at least two of the first power source circuit section, the second power source circuit section, and the common power source circuit section being housed in one package.

In the electronic control apparatus described above, the first magnetism detecting element and the second magnetism detecting element are housed in one package, each of the first magnetism detecting element and the second magnetism detecting element being independent.

In the electronic control apparatus described above, the monitoring circuit section is configured to supply power to the second magnetism detecting element.

According to the one preferable preferred embodiment of the present application, it is possible to provide an electronic control apparatus for electric power steering for which cost reduction due to reduction of the number of parts is realized, and improvement of reliability is realized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An electronic control apparatus for electric power steering (EPS-ECU) according to a preferable preferred embodiment of the present invention (hereinafter, referred to merely as the present preferred embodiment) will be described in detail below.

Figure 1:
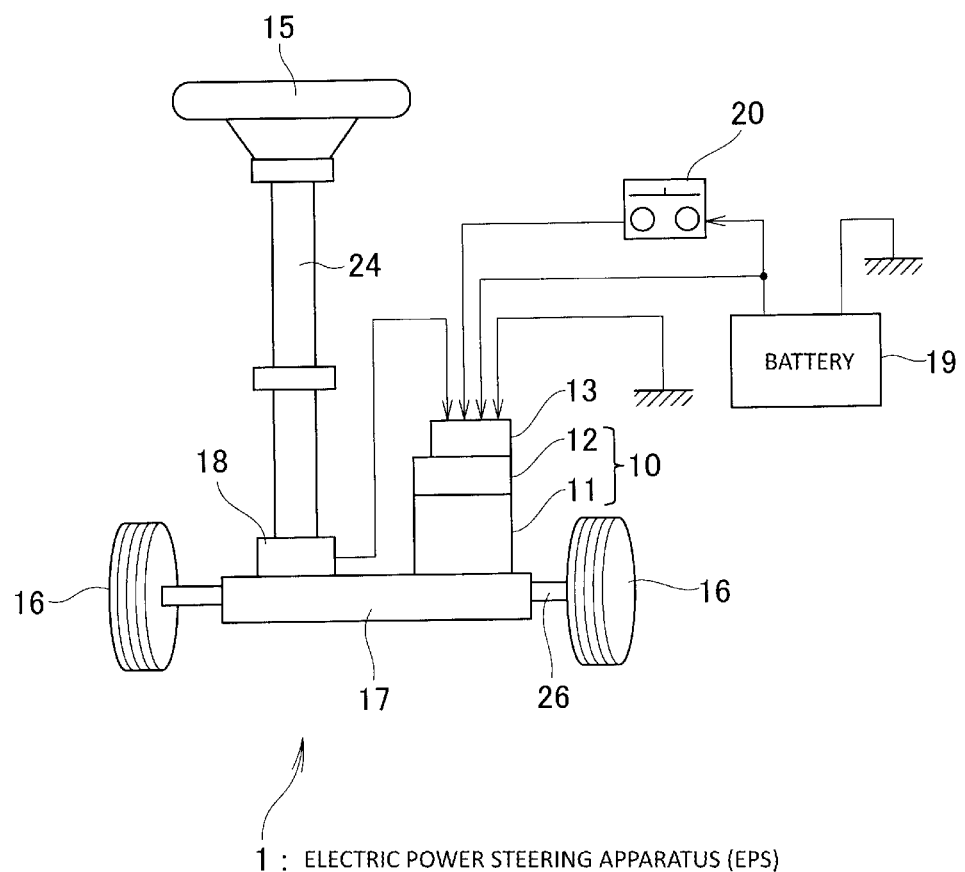
FIG. 1 is an overall configuration diagram of an electric power steering apparatus mounted with an electronic control apparatus for electric power steering according to a preferred embodiment of the present invention.

As shown in FIG. 1, an electric power steering apparatus 1 mounted with the electronic control apparatus for electric power steering according to the preferred embodiment of the present invention is provided with an assist torque mechanism which gives an assist torque to a steering system from a steering wheel 15 of a vehicle to steered vehicle wheels 16 of the vehicle. In the example shown in FIG. 1, the steering system is such that the steering wheel 15 is coupled with a rotation axis 24 via a steering column and a universal coupling; a rack shaft 26 is coupled with the rotation axis 24 via a rack-and-pinion mechanism 17; and the right and left steered vehicle wheels 16 are coupled with both ends of the rack shaft 26 via right and left swivel joints, tie rods and knuckles. The rack-and-pinion mechanism 17 is provided with a pinion provided on the rotation axis 24 and a rack provided on the rack shaft 26. With this steering system, it is possible for a driver to, by steering the steering wheel 15, steer the steered vehicle wheels 16 via the rack-and-pinion mechanism 17 by the steering torque.

The assist torque mechanism is a mechanism in which a steering torque of the steering system applied to the steering wheel 15 is detected by a steering torque sensor 18, an assist torque corresponding to the steering torque is generated by an electronic control apparatus for electric power steering 10 in which an electric motor 11 and an electronic control apparatus 12 are integrally formed, on the basis of a detection signal, transmitted to the rotation shaft 24, for example, via a worm gear mechanism, and further transmitted from the rotation shaft 24 to the rack-and-pinion mechanism 17 of the steering system. This electronic control apparatus for electric power steering 10 has two power source systems: a power source system for supplying power from a battery 19 via an ignition switch 20 and a power source system for continuously supplying power from the battery.

The electric power steering apparatus 1 can be classified as a pinion-assist type, a rack-assist type, a column assist type or the like according to a position where the assist torque described above is given to the steering system. Though the electric power steering apparatus 1 in FIG. 1 shows the pinion-assist type, the rack-assist type, the column-assist type or the like may be applied to the electric power steering apparatus 1.

Figure 2:
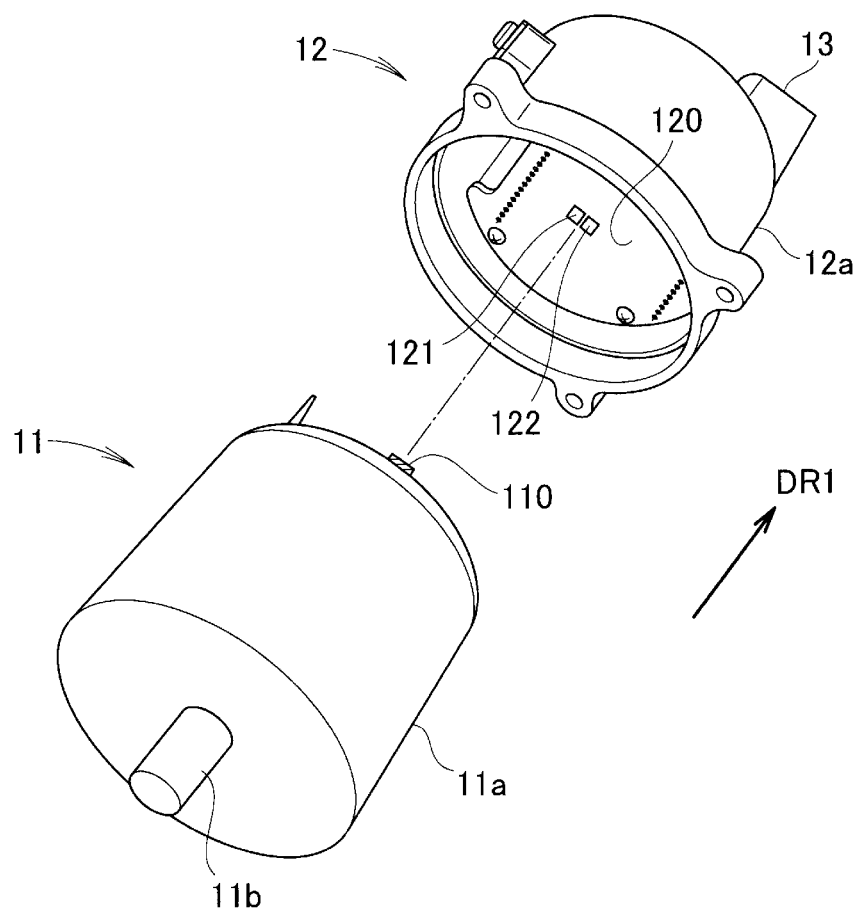
FIG. 2 is an exploded perspective view of the electronic control apparatus for electric power steering formed integrally with an electric motor.

FIG. 2 shows an exploded perspective view of the electronic control apparatus for electric power steering 10 formed integrally with an electric motor. According to FIG. 2, a apparatus cover 12a is a cover of the electronic control apparatus 12 in FIG. 1, and a motor cover 11a is a cover of the electric motor 11 in FIG. 1. The electronic control apparatus 12 is formed integrally with the electric motor 11 so that the apparatus cover 12a is arranged in a direction of a motor shaft 11b of the electric motor 11. In a case where a direction DR1 indicates an upward direction of the electric motor 11 in the example of FIG. 2, the electronic control apparatus 12 can be formed integrally with the electric motor 11 on the upper part of the electric motor 11. An external connector 13 projects in a direction of the motor shaft 11b (the direction DR1) and has at least one terminal for connecting the steering torque sensor 18 or the like and the electronic control apparatus 12.

The electronic control apparatus 12 includes, for example, a power source circuit, a current sensor for detecting a motor current (an actual current), a microprocessor, an FET bridge circuit, and a controller PCB 120 on which magnetism detecting elements and the like to be described later are implemented. The microprocessor can perform vector control of the electric motor 11 on the basis of a vehicle speed signal and the like provided from the outside, in addition to a torque signal. The FET bridge circuit controlled by the microprocessor is configured, for example, with a switching circuit for causing a driving current (a three-phase AC current) to flow through the electric motor 11 (a brushless motor).

The electronic control apparatus 12 as described above sets a target current on the basis of at least a steering torque (a torque signal), and, preferably, sets the target current in consideration of a vehicle speed detected by a vehicle speed sensor not shown and a rotation angle of a rotor detected by the magnetism detecting elements to be described later also. The electronic control apparatus 12 can control the driving current (a driving signal) of the electric motor 11 so that the motor current (the actual current) detected by the current sensor corresponds to the target current. With the electric power steering apparatus 1, it is possible to steer the steered vehicle wheels 16 with the rotation shaft 24 by a composite torque obtained by adding an assist torque of the electric motor 11 to a driver's steering torque.

Figure 3:
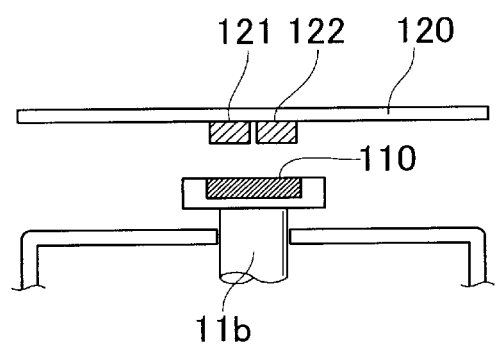
FIG. 3 is an implementation cross-sectional view of magnetism detecting elements shown in FIG. 2.

As shown in FIG. 2 and an implementation cross-sectional view in FIG. 3, two magnetism detecting elements 121 and 122 are implemented at a position opposite to a magnetic body 110 attached to the motor shaft 11b of the electric motor 11, on the back of the controller PCB 120. Each of the magnetism detecting elements 121 and 122 is configured with an MR sensor or a Hall element. As for their implementation position, in addition to the case where they are implemented on the back of the controller PCB 120 side by side as shown in FIG. 2, it is also possible to implement each of the magnetism detecting elements 121 and 122 on the front and back of the controller PCB 120 if the positions are opposite to the magnetic body 110 attached to the motor shaft 11b of the electric motor 11. On the front of the controller PCB 120, electric parts such as the microprocessor and the FET bridge circuit described above are implemented.

According to FIG. 3, the magnetic body 110 configured with a magnet or the like attached at an end of the motor shaft 11b configured in the electric motor exists at a position opposite to the magnetism detecting elements 121 and 122 implemented on the controller PCB 120. The magnetism detecting elements 121 and 122 are elements which detect a change in a magnetic field therearound. When the magnetic body 110 rotates, the magnetism detecting elements 121 and 122 output angle signals of a sine wave (sin θ) and a cosine wave (cos θ). An arithmetic operation of the angle signals outputted from the magnetism detecting elements 121 and 122 is performed by the microprocessor (a control section to be described later) to calculate angle information. The microprocessor controls the electric motor 11 on the basis of the calculated angle information.

Next, a basic configuration of the electronic control apparatus for electric power steering 10 according to the present preferred embodiment will be described with reference to FIG. 4.

Figure 4:
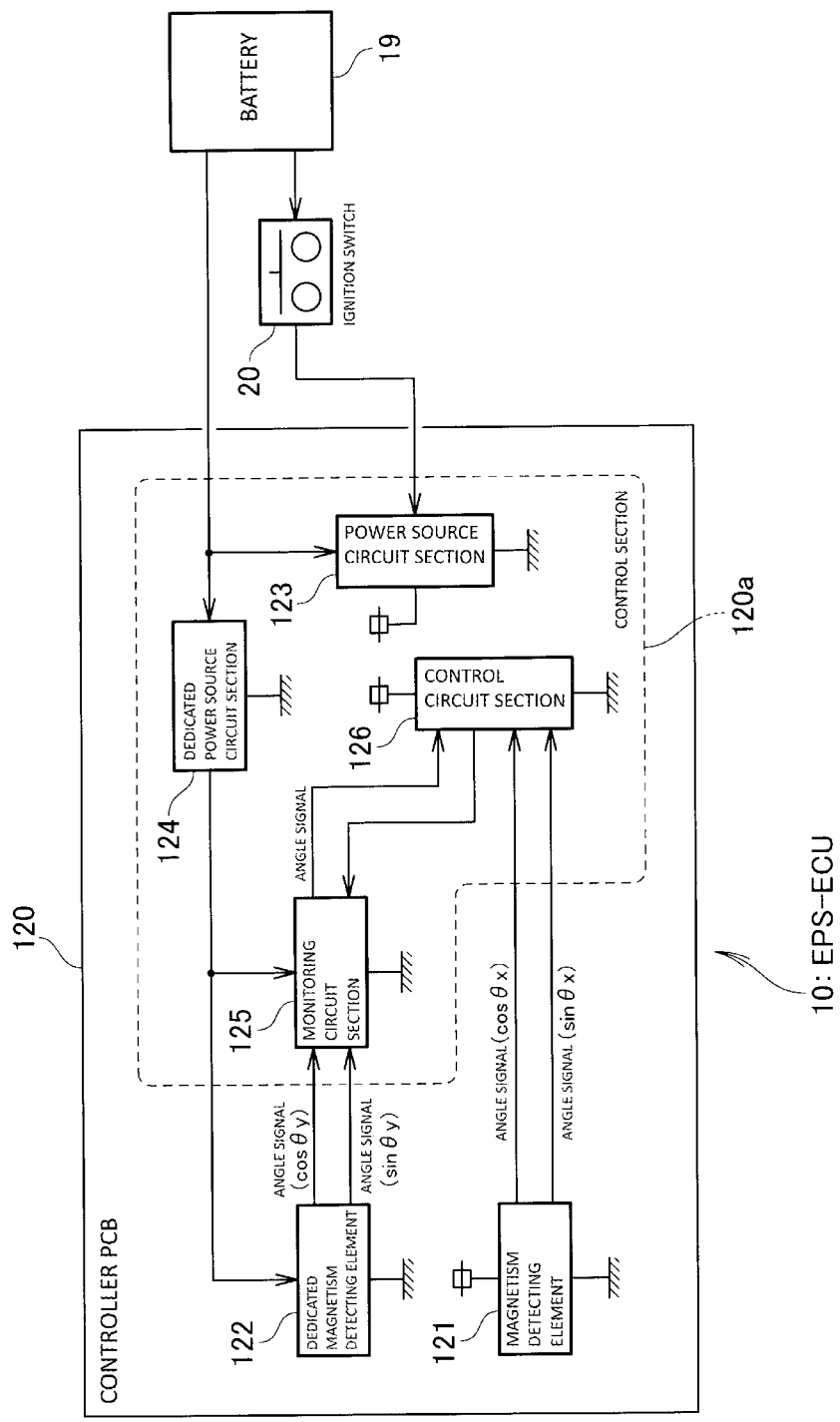
FIG. 4 is a block diagram showing an internal configuration of the electronic control apparatus for electric power steering according to the preferred embodiment of the present invention.

As shown in FIG. 4, the electronic control apparatus for electric power steering 10 according to the present preferred embodiment includes the controller PCB 120. In addition to a control section 120a, the two magnetism detecting elements are implemented on the controller PCB 120. One is the magnetism detecting element 121 driven by power supplied from the battery 19 via the ignition switch 20, and the other is the dedicated magnetism detecting element 122 driven by power continuously supplied from the battery 19.

Here, it is assumed that MR sensors are used as both of the magnetism detecting elements 121 and the dedicated magnetism detecting element 122. Each of the MR sensors 121 and 122 has a bridge circuit which includes at least one pair of magnetoresistive elements angular positions of which differ by a predetermined angular interval around the center of the rotation shaft, and the predetermined angular interval is an interval corresponding to a half of the angular arrangement interval among the plurality of magnetic poles around the center of the rotation shaft.

The control section 120a generates rotation angle information (an angle signal) about the electric motor 11 from rotation angle signals (cos θx, sin θx) obtained from the magnetism detecting element 121, and rotation angle signals (cos θy, sin θy) outputted from the dedicated magnetism detecting element 122 when the ignition switch 20 is not operating, and calculates a position of the steering wheel 15 from the generated rotation angle information. Therefore, the control section 120a is configured with a power source circuit section 123, a dedicated power source circuit section 124, a monitoring circuit section 125 and a control circuit section 126.

The power source circuit section 123 is connected to the battery 19 via the ignition switch 20 and supplies power to the magnetism detecting element 121 and the control circuit section 126. The dedicated power source circuit section 124 is connected to the battery 19 and continuously supplies power to the dedicated magnetism detecting element 122 and the monitoring circuit section 125. The monitoring circuit section 125 internally includes, for example, a microprocessor. When receiving a control instruction #1 from the control circuit section 126, the monitoring circuit section 125 acquires rotation angle signals from the dedicated magnetism detecting element 122, generates rotation angle information from the rotation angle signals and transmits the rotation angle information to the control circuit section 126. At this time, the monitoring circuit section 125 monitors the generated rotation angle information at predetermined time intervals set inside or monitors the generated rotation angle information at predetermined time intervals specified by the control circuit section 126.

The control circuit section 126 controls the monitoring circuit section 125 so that the control section 120a generates rotation angle information (an angle signal) about the electric motor 11 from rotation angle signals obtained from the magnetism detecting element 121, and the rotation angle signals outputted from the dedicated magnetism detecting element 122 when the ignition switch 20 is not operating, and calculates a position of the steering wheel 15 from the generated rotation angle information. Specifically, the control circuit section 126 stores rotation angle information about the electric motor 11 and position information about the steering wheel 15 immediately after the ignition switch 20 is turned off, and, when the ignition switch 20 is turned on again, calculates position information about the steering wheel 15 at the present time point from rotation angle information acquired from the monitoring circuit section 125 and the rotation angle information and position information about the steering wheel 15 stored before. The position information about the steering wheel 15 means rotation angle information about the steering column. Hereinafter, in order to avoid confusion with rotation angle information about the motor, the expression of position information about the steering wheel 15 will be used whenever referring to rotation angle information about the steering column.

When the ignition switch 20 operates (is turned on), the control circuit section 126 may acquire rotation angle information from the monitoring circuit section 125, compare a result of an arithmetic operation of the rotation angle of the electric motor 11 managed by the control circuit section 126 itself and the acquired rotation angle information to diagnose certainty of the rotation angle of the electric motor 11. When the ignition switch 20 operates, the control circuit section 126 may acquire angle signals from the dedicated magnetism detecting element 122 via the monitoring circuit section 125, compare the result of the arithmetic operation of the rotation angle of the electric motor 11 managed by the control circuit section 126 itself and rotation angle information obtained by arithmetic operation on the basis of the acquired angle signals to diagnose certainty of the rotation angle of the electric motor 11. Further, when the ignition switch 20 operates, the control circuit section 126 may acquire angle signals (sin θy, cos θy) from the dedicated magnetism detecting element 122 via the monitoring circuit section 125, compare the result of the arithmetic operation of the rotation angle of the electric motor 11 managed by the control circuit section 126 itself and rotation angle information obtained by performing an arithmetic operation on the basis of the acquired angle signals to diagnose certainty of output of the dedicated magnetism detecting element 121 or the dedicated magnetism detecting element 122.

When receiving the control instruction #1 from the control circuit section 126, the monitoring circuit section 125 calculates and stores a steering position of the steering wheel 15 on the basis of angle information generated on the basis of rotation angle signals outputted from the dedicated magnetism detecting element 122 and, when the ignition switch 20 operates, transmits the stored position information about the steering wheel 15 to the control circuit section 126. The monitoring circuit section 125 may calculate rotation position information about the electric motor 11 from rotation angle information on the basis of the time point of receiving the control instruction #1 and store the rotation position information, and, when the ignition switch 20 operates, transmits the stored rotation position information to the control circuit section 126.

When detecting that rotation angle information cannot be outputted when the ignition switch 20 is not operating (is off), the monitoring circuit section 125 may transmit an operation abnormality signal to the control circuit section 126. When detecting that rotation angle information cannot be outputted when the ignition switch 20 is not operating, the monitoring circuit section 125 may calculate position information about the steering wheel 15 when the ignition switch 20 operates and the steering wheel 15 is steered by the electric motor 11.

Figure 5:
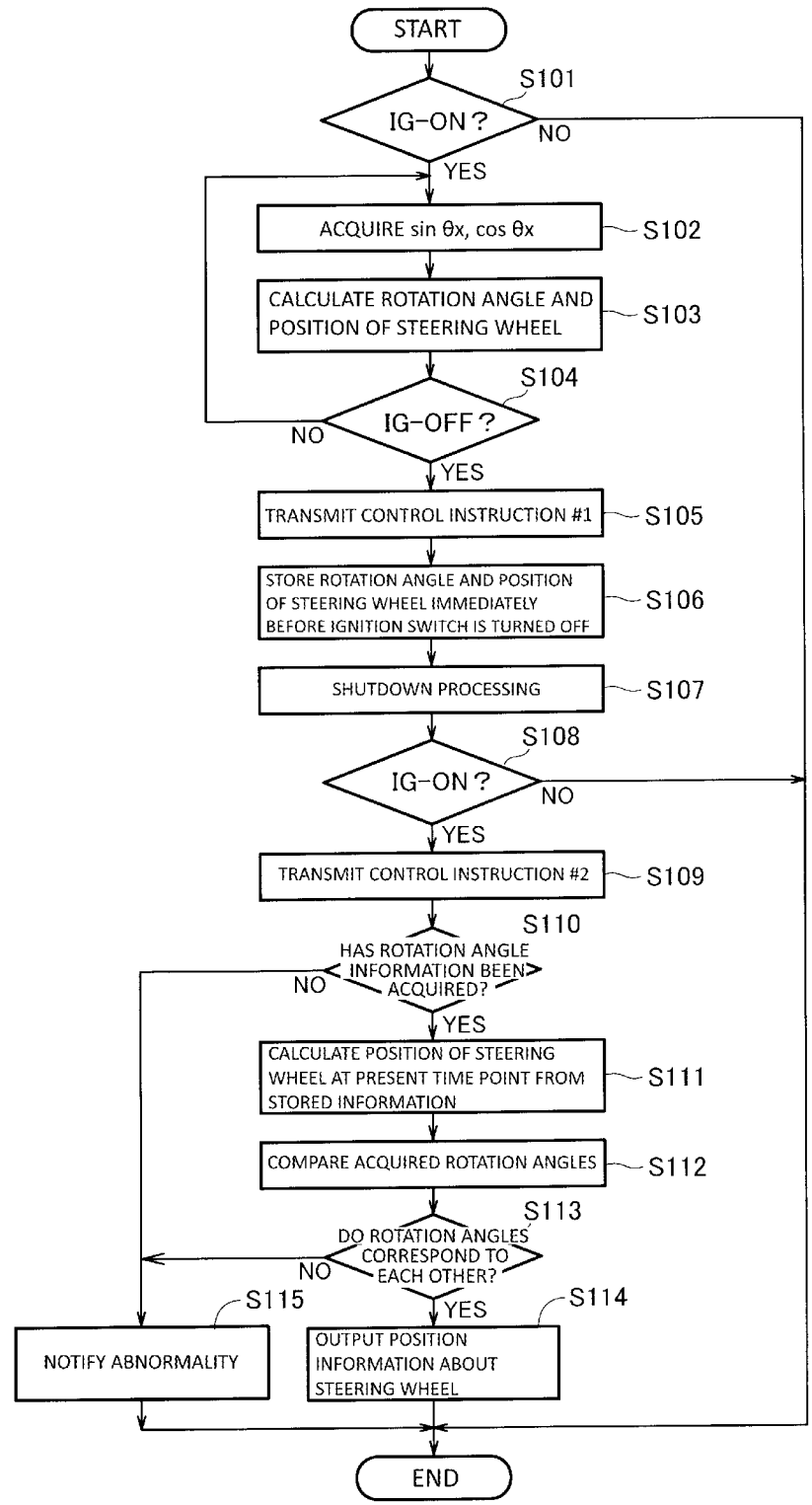
FIG. 5 is a flowchart showing an operation of a control circuit section of the electronic control apparatus for electric power steering according to the preferred embodiment of the present invention.
Figure 6:
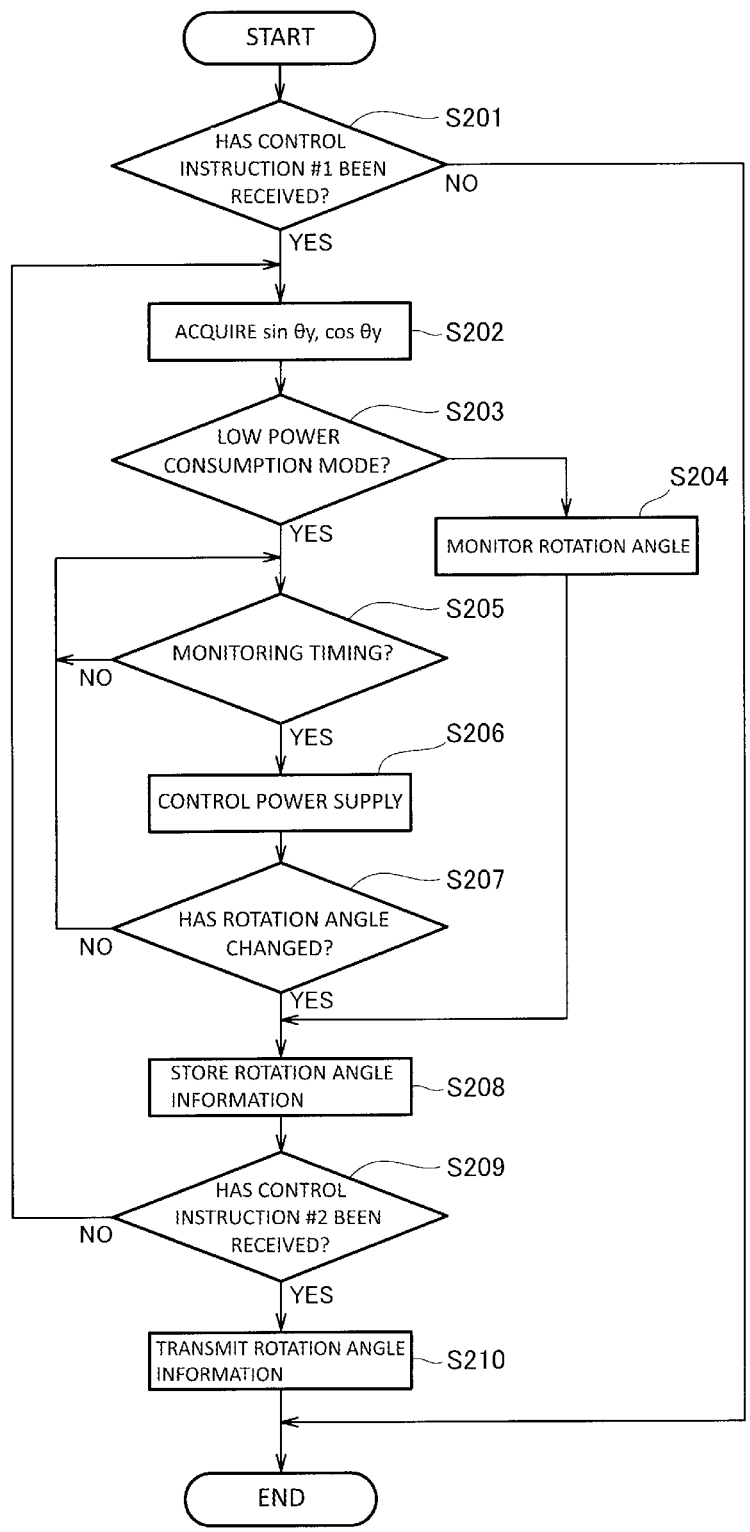
FIG. 6 is a flowchart showing an operation of a monitoring circuit section of the electronic control apparatus for electric power steering according to the preferred embodiment of the present invention.

Operations of the electronic control apparatus for electric power steering 10 (the control section 120a) of the present preferred embodiment will be described in detail below with reference to flowcharts in FIGS. 5 and 6.

First, an operation of the control section 120a (the control circuit section 126) will be described with reference to the flowchart in FIG. 5. The control circuit section 126 continuously monitors on/off of the ignition switch (IG) 20 (step S101). When it is detected that the ignition switch 20 is on (step S101: YES), the control circuit section 126 acquires angle signals of a sine wave (sin θx) and a cosine wave (cos θx) corresponding to a rotation angle θ of the electric motor 11 from the magnetism detecting element 121 (step S102) and calculates rotation angle information θx and a position of the steering wheel 15 (step S103). The position of the steering wheel 15 can be determined by executing arithmetic operation processing of an arc tangent function (arctan θ) on the basis of rotation angle information θ.

Next, when the ignition switch 20 is turned off (step S104: YES), the control circuit section 126 transmits the control instruction #1 to the monitoring circuit section 125 to request monitoring of angle signals during the ignition switch 20 being off (step S105). Then, rotation angle information and a position of the steering wheel 15 immediately before the ignition switch 20 is turned off are stored (step S106), and power source shutdown processing is executed to stop the operation (step S107). Though the power source circuit section 123 supplies power to the inside of the controller PCB 120 when the ignition switch 20 is on, it does not supply power to the inside of the controller PCB 120 when the ignition switch 20 is turned off. The electronic control apparatus for electric power steering of the present preferred embodiment, however, is configured such that it can supply power to the inside of the controller PCB 120 for a predetermined period by control by the control circuit section 126 even if the ignition switch 20 is turned off.

The power supplied to the dedicated magnetism detecting element 122 and the monitoring circuit section 125 is generated by the dedicated power source circuit section 124. Since being directly connected to the battery 19 not via the ignition switch 20, the dedicated power source circuit section 124 can continue continuously supplying power even when the ignition switch 20 is not on. Therefore, as described later, when receiving the control instruction #1 from the control circuit section 126, the monitoring circuit section 125 acquires rotation angle signals (sin θy, cos θy) at the time of the ignition switch 20 not being operating, from the dedicated magnetism detecting element 122 and monitors the rotation angle signals to generate rotation angle information θ.

Then, when the ignition switch 20 is turned on again (step S108: YES), the control circuit section 126 transmits a control instruction #2 to the monitoring circuit section 125 to make a rotation angle information acquisition request (step S109). Thereby, rotation angle information during the ignition switch 20 being off is detected by the dedicated magnetism detecting element 122, the control circuit section 126 acquires the rotation angle information monitored by the monitoring circuit section 125 (step S110). When acquiring the rotation angle information during the ignition switch 20 being off from the monitoring circuit section 125 (step S110: YES), the control circuit section 126 calculates position information about the steering wheel 15 at the present time point on the basis of the rotation angle information about the electric motor 11 and position information about the steering wheel 15 stored immediately after the ignition switch 20 was turned off (step S111). On the other hand, detecting that the rotation angle information cannot be acquired (step S110: NO), the control circuit section 126 gives an abnormality notification to the effect that it is not possible to perform rotation angle monitoring at the time of the ignition switch 20 not being operating (S115).

With the electronic control apparatus for electric power steering 10 according to the present preferred embodiment, two magnetic sensors are provided like the magnetism detecting element 121 and the dedicated magnetism detecting element 122. That is, different power supply systems are used for the magnetism detecting element 121 and the dedicated magnetism detecting element 122, and they exist independently from each other. Therefore, they mutually compare obtained pieces of angle information (step S112), and compare pieces of rotation angle information obtained by an arithmetic operation on the basis of angle signals or compare pieces of position information about the steering wheel 15 obtained by an arithmetic operation on the basis of the angle information. Then, if the pieces of information correspond to each other (step S113: YES), the position information about the steering wheel 15 determined by the arithmetic operation is outputted to reflect it on control for assisting steering of the steering wheel 15 (step S114). If the pieces of information do not correspond to each other (step S113: NO), an abnormality of the magnetism detecting element 121 or the dedicated magnetism detecting element 122 can be detected, and, by notifying the abnormality to the outside (step S115), reliability can be improved.

Next, an operation of the monitoring circuit section 125 will be described with reference to the flowchart in FIG. 6. When the ignition switch 20 is turned off, the control circuit section 126 transmits the control instruction #1 to the monitoring circuit section 125 to request monitoring of the rotation angle of the electric motor 11 during the ignition switch 20 being off. At this time, the control circuit section 126 has already stored the rotation angle of the electric motor 11 and position information about the steering wheel 15 immediately after the ignition switch 20 was turned off. When receiving the control instruction #1 (step S201: YES), the monitoring circuit section 125 acquires angle signals sin θy and cos θy of the dedicated magnetism detecting element 122 and monitors the rotation angle of the electric motor 11 on the basis of the acquired angle signals (step S202).

At the time of monitoring the rotation angle of the electric motor 11, the monitoring circuit section 125 may alternately and repeatedly execute monitoring of the rotation of the electric motor 11 and non-monitoring of the rotation of the electric motor 11 (hereinafter referred to as a low power consumption mode) at predetermined time intervals. Here, the low power consumption mode means stopping power supply to the dedicated magnetism detecting element 122 for a predetermined period or temporarily decreasing current consumption of the monitoring circuit section 125. However, when the period of the low power consumption mode is long, it becomes impossible to detect that the electric motor 11 has rotated even when the electric motor 11 has rotated. Therefore, it is desirable to set the period within a range not influencing the rotation angle monitoring of the electric motor 11.

In the case of causing the monitoring circuit section 125 to calculate the position information about the steering wheel 15 also, it is assumed that it takes a time to calculate the position information, and power consumption increases. Therefore, if the arithmetic operation of the monitoring circuit section 125 is limited only to calculation of how many times the electric motor 11 has rotated right and left after the ignition switch 20 was turned off, the processing time is reduced, and the monitoring time is shortened. Therefore, power consumption of the battery 19 is reduced. If, while repeating monitoring of the rotation angle of the electric motor 11 and the low power consumption mode alternately at the predetermined time intervals, the monitoring circuit section 125 detects angle change of the electric motor 11 and continues monitoring until the angle change of the electric motor 11 stops, the accuracy of monitoring of the rotation angle of the electric motor 11 is improved.

That is, while being not in the low power consumption mode but in an ordinary monitoring mode (step S203: NO), the monitoring circuit section 125 monitors the rotation angle by an arithmetic operation on the basis of angle signals acquired from the dedicated magnetism detecting element 122 (step S204) and stores rotation angle information obtained by the monitoring each time (step S208). On the other hand, while being in the low power consumption mode (step S203: YES), and the monitoring timing at predetermined time intervals comes (step S205: YES), the monitoring circuit section 125 stops power supply to the dedicated magnetism detecting element 122 for the predetermined period or performs control for causing current consumption to temporarily decrease (step S206). Then, only when the rotation angle changes (step S207: YES), information about the rotation angle is stored (step S208).

Then, the ignition switch 20 is turned on, and the control circuit section 126 transmits the control instruction #2 to the monitoring circuit section 125 to request acquisition of rotation angle information about the electric motor 11 during the ignition switch 20 being off. When receiving the control instruction #2 (step S209: YES), the monitoring circuit section 125 transmits the rotation angle information about the electric motor 11 monitored while the ignition switch 20 was off, to the control circuit section 126 (step S210). Thereby, the control circuit section 126 derives a position of the steering wheel 15 at the present time point using rotation angle information about the electric motor 11, and the rotation angle information about the electric motor 11 and position information about the steering wheel 15 stored immediately after the ignition switch 20 was off from the monitoring circuit section 125. If the control instruction #2 is not received (step S209: NO), the monitoring circuit section 125 repeatedly executes the process at and after step S202 to perform rotation angle monitoring, and repeatedly executes storage of rotation angle information.

The monitoring circuit section 125 may calculate position information about the steering wheel 15 on the basis of rotation position information about the electric motor 11 without depending on on/off of the ignition switch 20. In this case, the control circuit section 126 acquires the position information about the steering wheel 15 of the monitoring circuit section 125 by requesting it each time the ignition switch 20 is turned on.

On the other hand, for example, if the battery 19 is removed from the vehicle, it is assumed that the monitoring circuit section 125 cannot monitor the rotation angle of the electric motor 11 during the ignition switch 20 being off. If the rotation angle of the electric motor 11 cannot be monitored when the ignition switch 20 is off, data stored inside the monitoring circuit section 125 is reset so that data to be outputted does not exist when the ignition switch 20 is turned on, and the control circuit section 126 transmits the control instruction #2 to the monitoring circuit section 125 to request rotation angle information next time. Thereby, it is also possible for the control circuit section 126 to detect an abnormality, and, therefore, reliability with regard to an abnormality can be improved.

As described above, according to the present preferred embodiment, the electronic control apparatus for electric power steering 10 formed integrally with the electric motor 11 is provided with two systems of magnetism detecting elements (the magnetism detecting element 121 and the dedicated magnetism detecting element 122); the control section 120a generates rotation angle information about the electric motor 11 from first set of rotation angle signals (sin θx, cos θx) outputted from the magnetism detecting element 121 and second set of rotation angle signals (sin θy, cos θy) outputted from the dedicated magnetism detecting element 122 when the ignition switch 20 is not operating; and a position of the steering wheel 15 is calculated from the generated rotation angle information. Thereby, the number of parts is reduced to realize cost reduction, and reliability is improved.

Specifically, it is possible to provide the electronic control apparatus for electric power steering 10 from which advantages enumerated below can be obtained.

(1) By providing the electronic control apparatus for electric power steering 10 with functions of an angle sensor, a PCB for the angle sensor, and harness parts for connecting the angle sensor and a controller therefor are unnecessary, and, thereby, cost reduction is possible.

(2) Since the harness parts are unnecessary, noise resistance is improved.

(3) Since two systems of magnetism detecting elements are used, it becomes possible to detect an abnormality when one magnetism detecting element breaks down, by comparing rotation angles of the electric motor 11 derived from the magnetism detecting elements. Thereby, reliability is improved.

(4) By reducing the contents of angle arithmetic operation processing performed when the ignition switch 20 is off, a monitoring time required at the time of monitoring the rotation angle of the electric motor 11 during the ignition switch 20 being off at predetermined intervals can be set short. As a result, power saving becomes possible.

(5) By notifying an abnormality when detection of the rotation angle of the electric motor 11 during the ignition switch 20 being off is not performed, assist control using uncertain data is prevented, and, therefore, reliability is improved.

Figure 7:
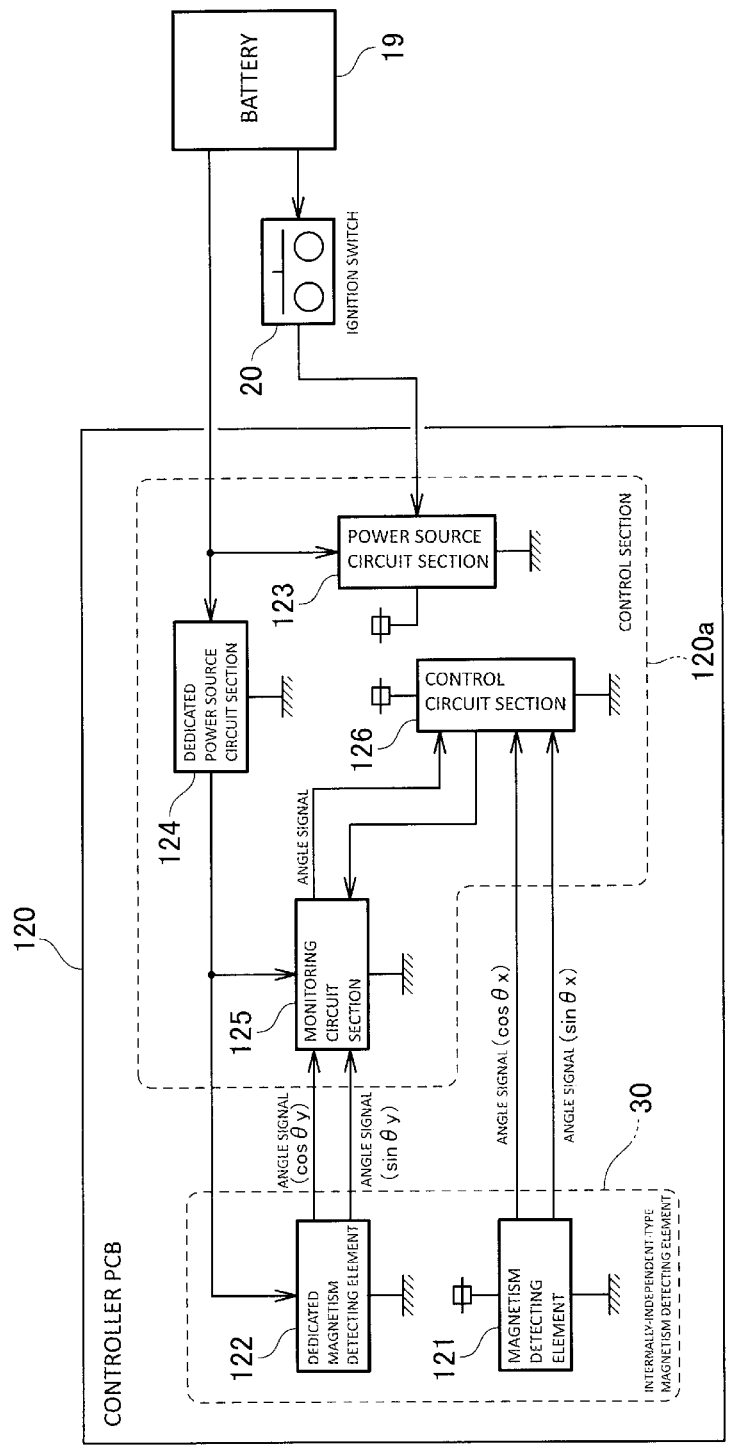
FIG. 7 is a block diagram showing an internal configuration of an electronic control apparatus for electric power steering of a modification 1.

Next, a basic configuration of an electronic control apparatus for electric power steering 10A according to a modification 1 of the present preferred embodiment will be described with reference to FIG. 7.

Description has been made on the assumption that, in the electronic control apparatus for electric power steering 10 according to the present preferred embodiment shown in FIG. 4, each of the magnetism detecting element 121 and the dedicated magnetism detecting element 121 is an independent element. In the modification 1 described below, however, there is provided an internally-independent-type magnetism detecting element 30 obtained by including the magnetism detecting element 121 and the dedicated magnetism detecting element 122 into one package. Thereby, elements for detection of magnetism are integrated into one, and cost reduction and downsizing of the electronic control apparatus for electric power steering 10A due to reduction of the area of the PCB become possible.

Though the internally-independent-type magnetism detecting element 30 is used according to the modification 1, any such a type is possible that each of the angle signals (sin θx, cos θx) and the angle signals (sin θy, cos θy) can be detected and that, for example, one element does not influence the other element when the one element falls into a failure mode, even though the elements are not completely independent from each other.

Next, a basic configuration of an electronic control apparatus for electric power steering 10B according to a modification 2 of the present preferred embodiment will be described with reference to FIG. 8.

In the electronic control apparatus for electric power steering 10 according to the present preferred embodiment shown in FIG. 4, it is assumed that each of the power source circuit section 123 and the dedicated power source circuit section 124 is an independent power source circuit. In comparison, in the modification 2 described below, a common power source circuit section 40 is used which has the functions of both of the power source circuit section 123 and the dedicated power source circuit section 124. In this case, the power source circuits are integrated, and cost reduction and downsizing of the electronic control apparatus for electric power steering 10B due to reduction of the area of the PCB become possible.

Figure 9:
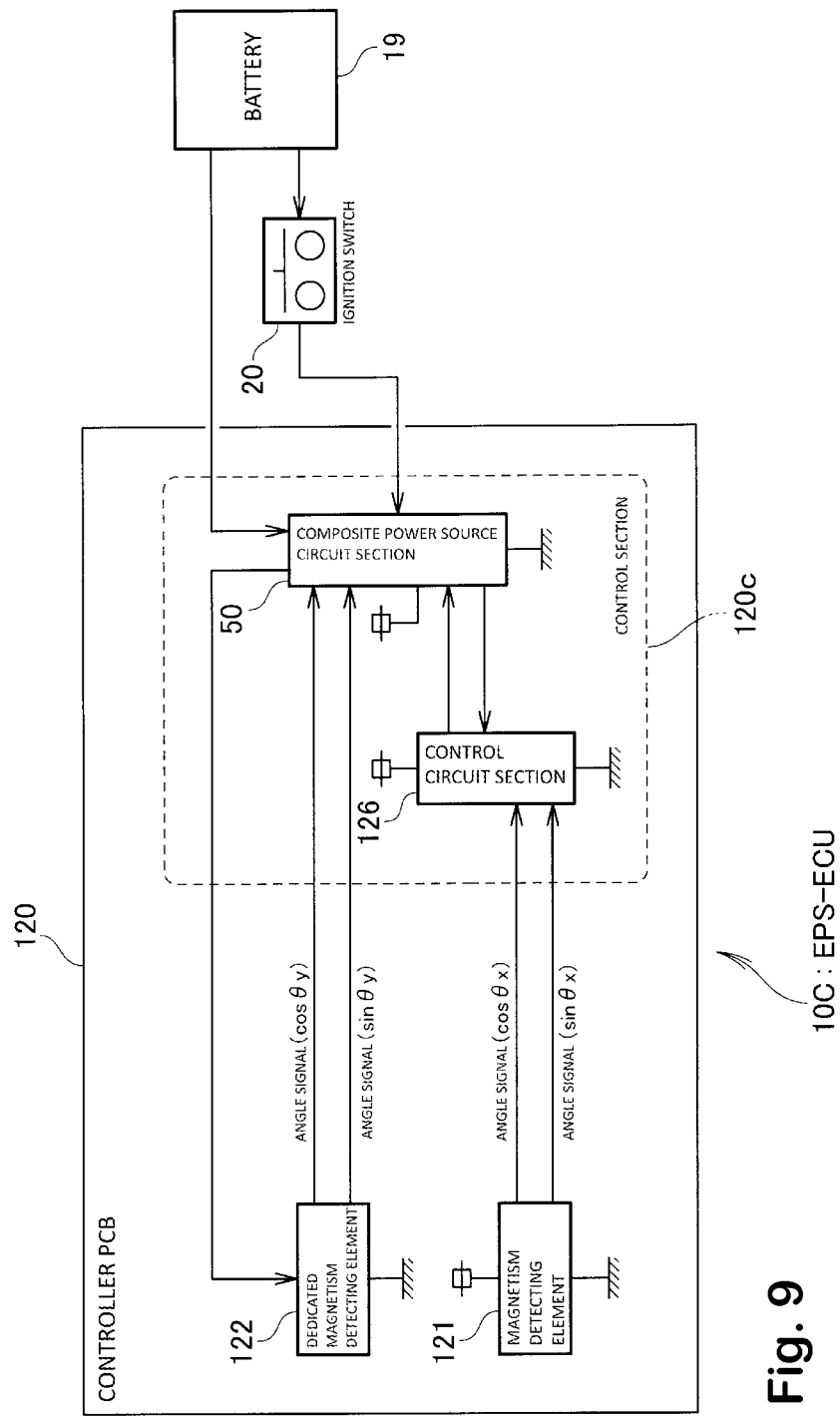
FIG. 9 is a block diagram showing an internal configuration of an electronic control apparatus for electric power steering of a modification 3.

Next, a basic configuration of an electronic control apparatus for electric power steering 10C according to a modification 3 of the present preferred embodiment will be described with reference to FIG. 9.

Figure 8:
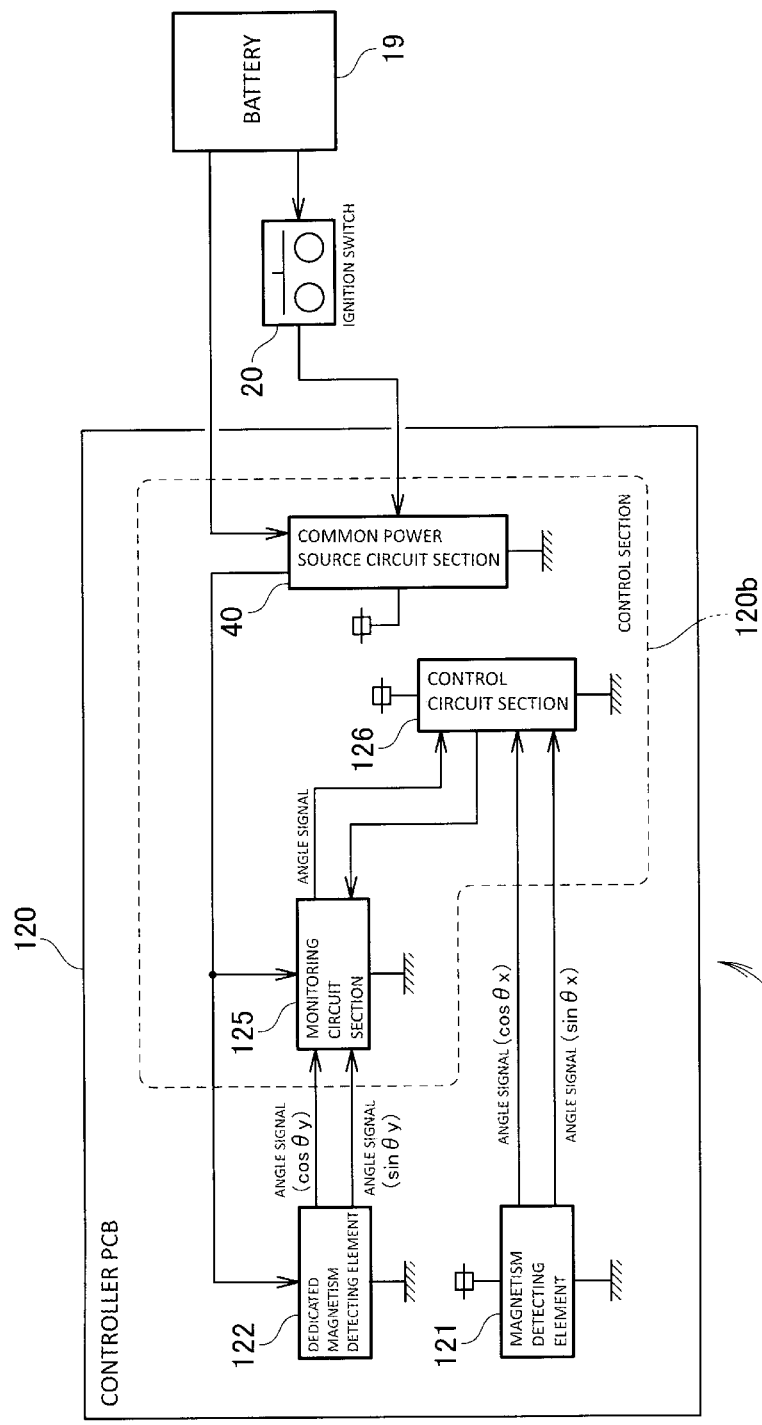
FIG. 8 is a block diagram showing an internal configuration of an electronic control apparatus for electric power steering of a modification 2.

In the electronic control apparatus for electric power steering 10B according to the modification 2 shown in FIG. 8, an example of causing the power source circuit section 123 and the dedicated power source circuit section 124 to be common by the common power source circuit section 40. In comparison, in the modification 3 described below, a composite power source circuit section 50 is used which has not only the functions of the common power source circuit section 40 but also the functions of the monitoring circuit section 125. In this case, the common power source circuit section 40 and the monitoring circuit section 125 are integrated, and further cost reduction and downsizing of the electronic control apparatus for electric power steering 10C due to reduction in the area of the PCB become possible in comparison with the modification 2.

In the preferred embodiment (FIG. 4) and the modification 1 and 2 (FIGS. 7 and 8), description has been made on the assumption that power supply to the dedicated magnetism detecting element 122 is performed from the dedicated power source circuit section 124. However, to stop the power supply of the dedicated power source circuit section 124 means to stop power supply to the monitoring circuit section 125 also, and, in this case, the monitoring circuit section 125 cannot perform angle monitoring during the ignition switch 20 being off. Therefore, power may be supplied to the dedicated magnetism detecting element 122 from the monitoring circuit section 125. Specifically, the power is supplied from a microcomputer port included in the monitoring circuit section 125. In this case, power consumption can be suppressed. In the modifications 1, 2 and 3, description has been made on a configuration in which internally included elements are integrated into one package by using the internally-independent-type magnetism detecting element 30, the common power source circuit section 40 and the composite power source circuit section 50, respectively. However, the configuration is not limited to this form, and integration of functions by combining two or more among the magnetism detecting element 121, the dedicated magnetism detecting element 122, the monitoring circuit section 125, the power source circuit section 123 and the dedicated power source circuit section 124, further downsizing and further cost reduction become possible.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic control apparatus configured to control electric power steering and provided integrally with an electric motor, the electronic control apparatus which is electrically connected to an ignition switch and which assists a rotation operation of a steering column by rotation of the electric motor, the electronic control apparatus comprising:
   a magnetic body attached to a rotation shaft of the electric motor and provided with a pole face including a plurality of magnetic poles arranged at equal or substantially equal intervals in a circumferential direction of the rotation shaft;
   a first magnetism detecting element located at a position opposite to the pole face and configured to operate using power supplied via the ignition switch to output a first set of rotation angle signals of the electric motor;
   a second magnetism detecting element located at the position opposite to the pole face and configured to operate continuously using continuously supplied power supplied directly from a power source to output a second set of rotation angle signals of the electric motor; and
   a controller configured or programmed to generate rotation angle information about the electric motor based on the first set of rotation angle signals when the ignition switch is operated and based on the second set of rotation angle signals outputted while the ignition switch is stopped, the controller also being configured or programmed to calculate a position of a steering wheel from the generated rotation angle information.

2. The electronic control apparatus according to claim 1, wherein the first magnetism detecting element is an MR sensor, and the second magnetism detecting element is an MR sensor or a Hall element.

3. The electronic control apparatus according to claim 2, wherein
   the MR sensor includes a bridge circuit including at least one pair of magnetoresistive elements angular positions of which differ by a predetermined angular interval around the center of the rotation shaft; and
   the predetermined angular interval is an interval corresponding to a half of the angular arrangement interval among the plurality of magnetic poles around the center of the rotation shaft.

4. The electronic control apparatus according to claim 1, wherein
   the controller is configured or programmed to include:
   a control circuit section configured to calculate position information about the steering wheel; and
   a monitoring circuit section configured to acquire the second set of rotation angle signals from the second magnetism detecting element, to generate a second rotation angle information from the second set of rotation angle signals, and to transmit the second rotation angle information or the second set of rotation angle signals to the control circuit section, when receiving a control instruction from the control circuit section.

5. The electronic control apparatus according to claim 4, wherein the monitoring circuit section is configured to monitor the generated second rotation angle information at predetermined time intervals set inside the monitoring circuit section.

6. The electronic control apparatus according to claim 4, wherein the monitoring circuit section is configured to monitor the generated second rotation angle information at predetermined time intervals specified by the control circuit section.

7. The electronic control apparatus according to claim 4, wherein
   the control circuit section is configured to store the second rotation angle information about the electric motor and the position information about the steering wheel immediately after the ignition switch is stopped; and
   when the ignition switch operates a next time, the control circuit section is configured to calculate position information about the steering wheel at a present time point from the second rotation angle information acquired from the monitoring circuit section and the stored position information about the steering wheel.

8. The electronic control apparatus according to claim 4, wherein, when the ignition switch operates, the control circuit section is configured to acquire the second rotation angle information from the monitoring circuit section, compare a result of an arithmetic operation of a rotation angle of the electric motor managed by the control circuit section itself, and use the acquired second rotation angle information to diagnose certainty of the rotation angle of the electric motor.

9. The electronic control apparatus according to claim 4, wherein, when the ignition switch operates, the control circuit section is configured to acquire the second set of rotation angle signals from the second magnetism detecting element via the monitoring circuit section, compare the result of an arithmetic operation of a rotation angle of the electric motor managed by the control circuit section itself, and use the second rotation angle information obtained by an arithmetic operation on the basis of the acquired second set of rotation angle signals to diagnose certainty of the rotation angle of the electric motor.

10. The electronic control apparatus according to claim 4, wherein, when the ignition switch operates, the control circuit section is configured to acquire the second set of rotation angle signals from the second magnetism detecting element via the monitoring circuit section, compare the result of calculation of a rotation angle of the electric motor managed by the control circuit section itself, and use the second rotation angle information obtained by performing an arithmetic operation on the basis of the acquired second set of rotation angle signals to diagnose certainty of output of the first magnetism detecting element or the second magnetism detecting element.

11. The electronic control apparatus according to claim 4, further comprising:
a battery which defines the power source;
a first power source circuit section electrically connected to the battery via the ignition switch to supply power to the first magnetism detecting element and the control circuit section; and
a second power source circuit section electrically connected to the battery to directly supply power to the second magnetism detecting element and the monitoring circuit section.

12. The electronic control apparatus according to claim 11, wherein the monitoring circuit section is configured to supply power directly to the second magnetism detecting element.

13. The electronic control apparatus according to claim 4, further comprising a common power source circuit section including:
a battery which defines the power source;
a first power source output terminal connected to the battery via the ignition switch to distribute power outputted from the battery to the first magnetism detecting element and the control circuit section via the ignition switch; and
a second power source output terminal electrically connected to the battery to distribute power outputted from the battery directly to the second magnetism detecting element and the monitoring circuit section.

14. The electronic control apparatus according to claim 13, further comprising a composite integrated circuit section including at least two of the first power source circuit section, the second power source circuit section, and the common power source circuit section, the at least two of the first power source circuit section, the second power source circuit section, and the common power source circuit section being housed in one package.

15. The electronic control apparatus according to claim 14, wherein the monitoring circuit section is configured to supply power directly to the second magnetism detecting element.

16. The electronic control apparatus according to claim 13, wherein the monitoring circuit section is configured to supply power directly to the second magnetism detecting element.

17. The electronic control apparatus according to claim 1, wherein
the controller is configured or programmed to include:
a control circuit section; and
a monitoring circuit section configured to calculate a steering position of the steering wheel based on the second rotation angle information generated based on the second set of rotation angle signals outputted from the second magnetism detecting element and storing the steering position of the steering wheel, when receiving a control instruction from the control circuit section, and, when the ignition switch operates, transmitting the stored position information about the steering wheel to the control circuit section.

18. The electronic control apparatus according to claim 17, wherein the monitoring circuit section is configured to calculate rotation position information about the electric motor from the second rotation angle information based on the time point of receiving the control instruction, store the rotation position information, and, when the ignition switch operates, transmit the stored rotation position information to the control circuit section.

19. The electronic control apparatus according to claim 18, wherein, if the monitoring circuit section detects that it is not possible to output the second rotation angle information while the ignition switch is stopped, the monitoring circuit section calculates the position information about the steering wheel when the ignition switch operates a next time and the steering column is steered by the electric motor.

20. The electronic control apparatus according to claim 17, wherein the monitoring circuit section is configured to transmit an operation abnormality signal to the control circuit section when the monitoring circuit section detects that it is not possible to output the second rotation angle information while the ignition switch is stopped.

21. The electronic control apparatus according to claim 17, wherein, if the monitoring circuit section detects that it is not possible to output the second rotation angle information while the ignition switch is stopped, the monitoring circuit section calculates the position information about the steering wheel when the ignition switch operates a next time and the steering column is steered by the electric motor.

22. The electronic control apparatus according to claim 1, wherein the first magnetism detecting element and the second magnetism detecting element are housed in one package, each of the first magnetism detecting element and the second magnetism detecting element being independent.

23. The electronic control apparatus according to claim 22, wherein the monitoring circuit section is configured to supply power directly to the second magnetism detecting element.

* * * * *